R. W. MUNN.
FOOD WARMER.
APPLICATION FILED SEPT. 29, 1908.
927,997.
Patented July 13, 1909.
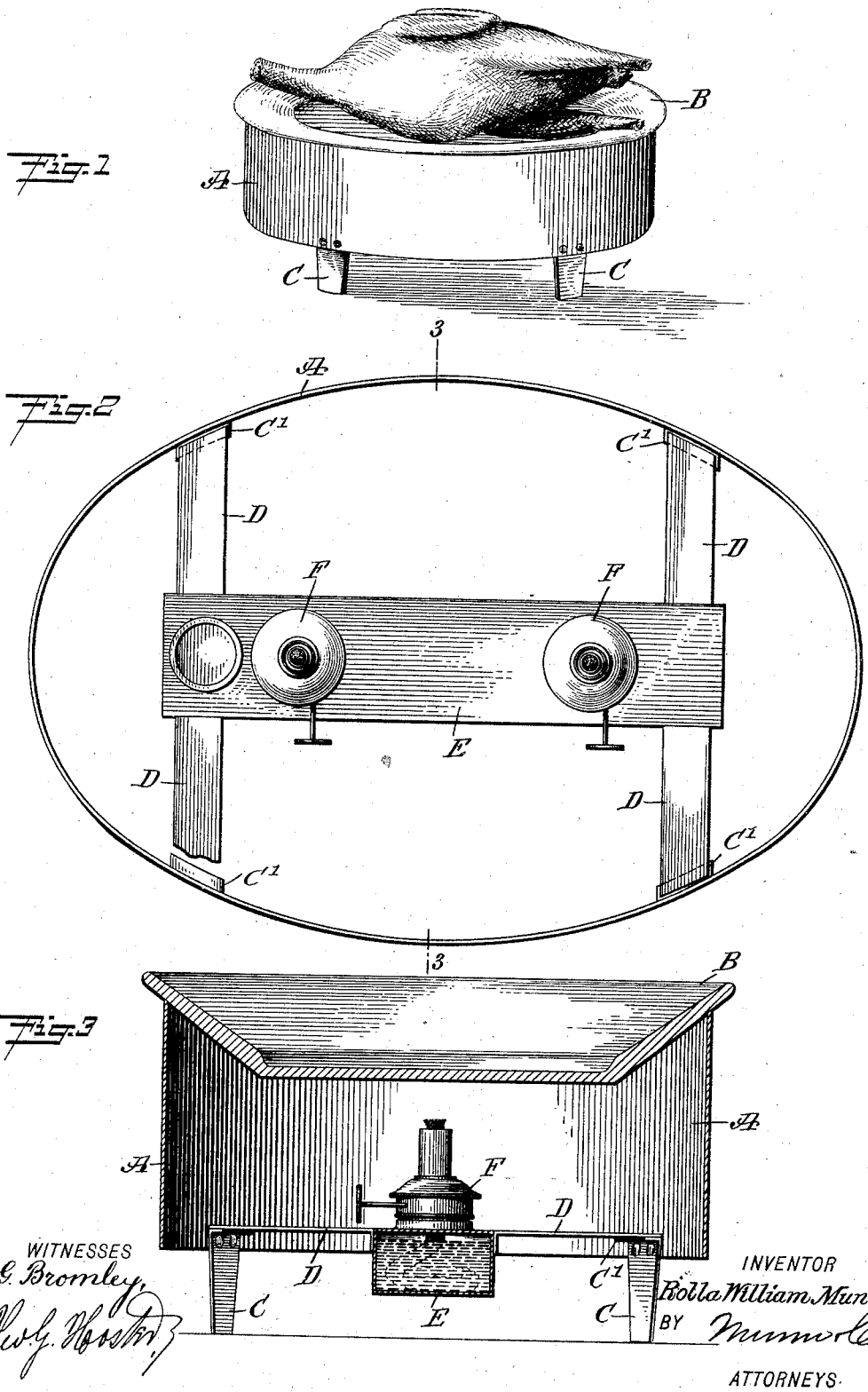
WITNESSES
E. G. Bromley
INVENTOR
Rolla William Munn
BY Munn & Co.
ATTORNEYS

UNITED STATES PATENT OFFICE.

ROLLA WILLIAM MUNN, OF TROY, NEW YORK.

FOOD-WARMER.

No. 927,997.　　　Specification of Letters Patent.　　　Patented July 13, 1909.

Application filed September 29, 1908. Serial No. 455,316.

*To all whom it may concern:*

Be it known that I, ROLLA WILLIAM MUNN, a citizen of the United States, and a resident of Troy, in the county of Rensselaer and State of New York, have invented a new and Improved Food-Warmer, of which the following is a full, clear, and exact description.

The object of the invention is to provide a new and improved food warmer, more especially designed for use on tables in seaside restaurants and like places, in which open air dining predominates, the arrangement being such that the food warmer takes up comparatively little space on the table and allows carving and dishing of the food without removal of the dish containing the food from the warmer.

The invention consists of novel features and parts and combinations of the same, which will be more fully described hereinafter and then pointed out in the claims.

A practical embodiment of the invention is represented in the accompanying drawings forming a part of this specification, in which similar letters of reference indicate corresponding parts in all the views.

Figure 1 is a perspective view of the improvement and showing the dish, carrying food, in position; Fig. 2 is an enlarged plan view of the improvement; and Fig. 3 is a transverse section of the same on the line 3—3 of Fig. 2, and showing the dish for containing the food, in position.

The support A for the dish B containing food is in the form of an annular band, corresponding in shape to that of the dish B, that is, the band A is usually oval, as plainly indicated in Fig. 2. The support A is preferably made of sheet metal and is mounted on legs C, to hold the lower edge of the support A a suitable distance above the surface of the table on which the food warmer is used. The legs C are riveted or otherwise secured to the inside of the support A, and the upper ends of the legs terminate in inwardly-extending lugs C', on which rest the ends of bars D secured to the body or font E of a lamp, preferably of the alcohol type, and having one, two or more burners, according to the size of the food warmer. The terminals of the bars D fit the inner face of the support A, so as to hold the lamp against lateral movement, at the same time allowing convenient removal of the lamp whenever it is desired to clean or fill the same.

By the arrangement described, the lower open end of the support A is not unduly obstructed for the proper entrance and circulation of the air necessary for combustion, and the lamp is mounted in the lower portion of the support A so that the flame from the burners can readily reach, and properly heat the bottom of the dish B, so as to keep the food held on the dish in a warm condition.

It will also be noticed, by reference to Fig. 3, that the dish is firmly held in place on top of the support A, and closes the upper end thereof, and by this arrangement the user can readily carve or dish out the food without removing the dish B from the support A.

Preference is given to an alcohol lamp as the flame thereof is not liable to be blown out by sudden gusts of wind, so frequently experienced in open air dining in seaside resorts.

The food warmer shown and described is very simple and durable in construction, can be cheaply manufactured, and is not liable easily to get out of order.

Having thus described my invention, I claim as new and desire to secure by Letters Patent:

1. A food warmer for use on tables in open air dining, comprising an annular support in the form of a band for supporting on its upper edge a dish or the like, legs on the said support for holding the lower edge thereof above the surface of the table, lugs on the inside of the said support, a lamp, and supporting bars fixed on the lamp and adapted to rest on the said lugs to support the lamp below the upper edge of the said support.

2. A food warmer for use on tables in open air dining, comprising an annular support in the form of an oval band for supporting at its top edge the dish carrying the food, legs on the said support for holding the lower edge thereof above the surface of the table, lugs on the inside of the said support at the lower portion thereof, an alcohol lamp, and cross bars secured to the body of the lamp and resting on the said supports, the terminals of the cross bars fitting the inner surface of the support to hold the lamp against lateral movement.

3. A food warmer for use on tables in open air dining, comprising an oval band for supporting at its upper edge the food-carrying dish, legs attached to the lower end of the said band at the inside thereof, for supporting the band a distance above the surface of the table, the upper ends of the legs terminating in angular inwardly-extending lugs, an alcohol lamp, and supporting bars attached to the body of the lamp and adapted to rest on the said lugs to removably support the lamp within the opening of the band.

In testimony whereof I have signed my name to this specification in the presence of two subscribing witnesses.

ROLLA WILLIAM MUNN.

Witnesses:
AUGUSTUS H. FULLER,
JOHN D. HARBECK.